United States Patent [19]

Fischbeck

[11] Patent Number: 4,864,328
[45] Date of Patent: Sep. 5, 1989

[54] DUAL MODE INK JET PRINTER

[75] Inventor: Kenneth H. Fischbeck, Hanover, N.H.

[73] Assignee: Spectra, Inc., Hanover, N.H.

[21] Appl. No.: 240,948

[22] Filed: Sep. 6, 1988

[51] Int. Cl.$^4$ .......................... G01D 15/16; B41J 3/04
[52] U.S. Cl. .................................... 346/140 R; 346/46
[58] Field of Search ...................... 346/140, 46; 358/75

[56] References Cited

U.S. PATENT DOCUMENTS

| | | | |
|---|---|---|---|
| 4,554,556 | 11/1985 | Hirata | 346/140 X |
| 4,580,150 | 4/1986 | Tazaki | 346/140 |
| 4,680,596 | 7/1987 | Logan | 346/140 |
| 4,714,936 | 12/1987 | Helinski | 346/140 |
| 4,728,968 | 3/1988 | Hillmann | 346/140 |
| 4,812,859 | 3/1989 | Cotan | 346/140 |

*Primary Examiner*—Joseph W. Hartary
*Attorney, Agent, or Firm*—Brumbaugh, Graves, Donohue & Raymond

[57] ABSTRACT

In the embodiments of the invention described in the specification, a four-color ink jet printer includes a transport mechanism for conveying a record medium in one direction and an ink jet head containing a black ink nozzle array and a primary color ink nozzle array for scanning the record medium in a transverse direction while projecting drops of ink onto the record medium. A control unit provides two printing speeds in which either high-quality or high-speed printing can be accomplished. For high-speed printing all of the nozzles of both arrays are used, and for high-quality printing one-third of the nozzles in the black ink array and all of the nozzles in the primary color ink nozzle array are used and the record medium is transported at one-third the rate used for high-speed printing. In certain embodiments, the two arrays of nozzles are disposed at different angles with respect to the scanning motion of the ink jet head so that the nozzles of the primary color array are spaced in the direction of motion of the record medium by a greater distance than the nozzles of the black ink array. In other embodiments, the arrays are disposed at the same angle with respect to the scanning motion and the nozzles for the three primary colors may be alternated in the color nozzle array.

23 Claims, 2 Drawing Sheets

DUAL MODE INK JET PRINTER

BACKGROUND OF THE INVENTION

This invention relates to ink jet printers and, more particularly, to a new and improved ink jet printer having two modes of operation for printing at high quality or high speed.

In ink jet printers, and particularly color printers, the quality of the image produced by the printer depends in part on the spacing between successive lines of ink dots applied from the orifices of the ink jet head. For maximum definition, producing the highest-quality printing, the distance between the lines of dots produced by the ink jet should be very small, for example, about 0.003 inch or 3 mils. On the other hand, the printing time, i.e., the time required to print a segment of paper or other image-receiving medium, depends upon the scanning rate of the ink jet head and the number of lines printed to produce the segment. Thus, ink jet printing can be accomplished more quickly by printing with lines which are spaced farther apart than the spacing required for maximum quality, thereby producing a print having less than the best quality. In some instances, a larger number of nozzles is provided in an ink jet head to increase the printing speed but, where color printing is required, the same increase in the number of nozzles must be provided for each color to provide increased printing speed at maximum quality.

To overcome this problem, it has been proposed, for example, in the Tazaki U.S. Pat. No. 4,580,150, to provide an increased number of ink jet nozzles for ink used to print primary characters and a lower number of nozzles to print nonprimary characters in a different color ink and to print the primary characters at a higher speed than the nonprimary characters. With that arrangement, however, it is not possible to increase printing speed when printing the nonprimary characters, even if maximum print quality is not necessary.

SUMMARY OF THE INVENTION

Accordingly, it is an object of the present invention to provide a new and improved ink jet printer capable of producing high-quality printing in one mode of operation and high-speed printing in another mode of operation.

Another object of the invention is to provide an ink jet printer capable of printing all colors at one speed to produce high-quality imaging and all colors at a higher speed to produce draft-quality images.

These and other objects of the invention are attained by providing a printer with a print medium drive system for moving a print medium in a selected direction at least two different speeds and an ink jet head having at least two arrays of nozzles, the nozzles within each array having substantially the same spacing in the direction of motion of the print medium. For four-color printing, the ink jet head preferably includes one array of nozzles for black ink and three arrays of nozzles for primary color inks, each of the primary color ink arrays having one-third the number of nozzles as the black ink array. For high-speed printing, all of the nozzles are used and the print medium is advanced by the width of the black ink nozzle array for each printing scan of the head. For high-quality printing, the print medium is advanced at one-third of that speed and only one-third of the black ink nozzles are used.

In one preferred embodiment, the nozzles within one array have a different spacing in the direction of motion of the print medium than the nozzles in another array and, where four-color printing is used, the nozzles in the primary color ink arrays preferably have three times the spacing of the nozzles in the black ink array. In one nozzle arrangement, the nozzles of each array are aligned in a row which is oriented at a relatively small angle to the scanning motion of the head so as to provide a small spacing between the lines produced by adjacent nozzles despite a larger linear separation of the nozzles. The nozzles of each of the three primary color arrays may be aligned in a single row or in three separate rows, and they may be oriented at the same angle as the black ink array or at an angle which is three times the angle of orientation of the black ink nozzle array with respect to the direction of scanning motion.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
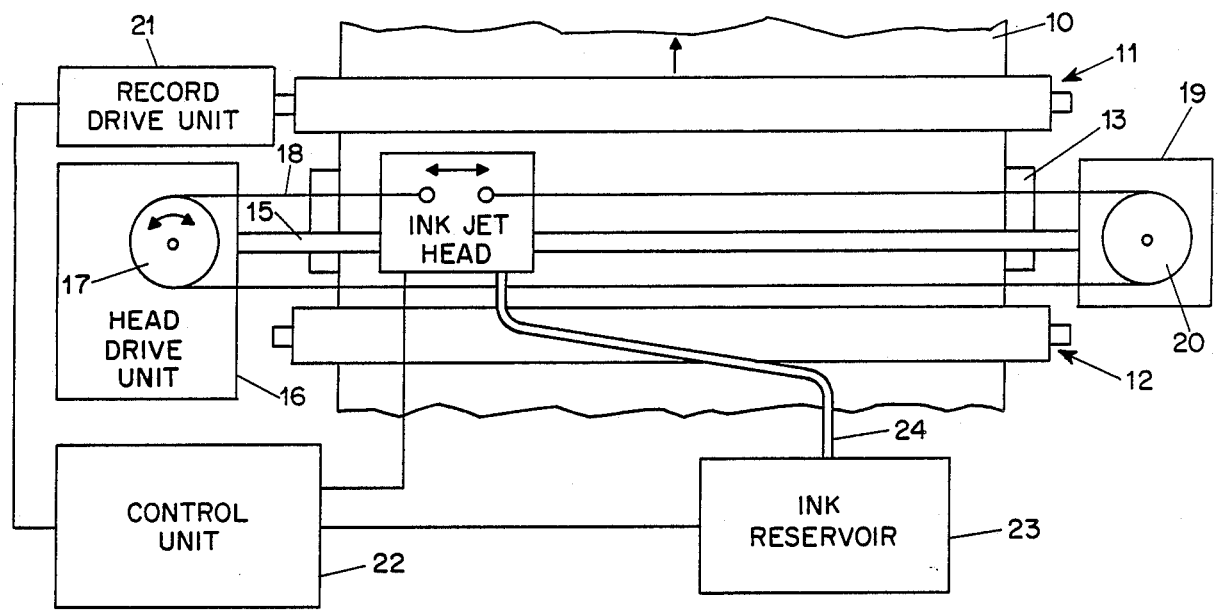
FIG. 1 is a schematic, diagrammatic view illustrating a representative embodiment of a portion of an ink jet printer arranged in accordance with the invention.

In the typical embodiment of the invention shown in the schematic view of FIG. 1, a record medium 10, such as paper, is supported by two pairs of pinch rollers 11 and 12, only one roller of each pair being visible in FIG. 1, and is held thereby in contact with a support platen 13. An ink jet head 14, mounted on a support bar 15 for reciprocal scanning motion in a direction across the width of the record medium 10, is positioned in closely spaced relation to the portion of the record medium 10 supported on the platen 13 so that ink drops ejected from the head 14 may be projected onto the record medium during each scanning motion. To scan the ink jet head across the width of the record medium 10, a head drive unit 16 includes a belt drive drum 17 arranged to drive a belt 18 in a reciprocating manner so as to move the ink jet head 14 back and forth with respect to the width of the record medium 10.

In order to advance the record medium in a direction perpendicular to the scanning motion during a printing operation, the pinch rollers 11 are driven by a record drive unit 21, which receives signals from a control unit 22, to advance the record medium 10 in the upward direction as viewed in FIG. 1 during printing. As a result, successive linear segments printed by the ink jet head 14 across the width of the record medium during successive transverse motions with respect to the record medium 10 are printed in adjacent relation on the record medium 10.

For this purpose, the control unit 22 controls the operation of the ink jet head 14 and the head drive unit 16 in a conventional manner so that the appropriate ink jet nozzles are actuated during each transverse motion of the head to provide the desired image on the record medium. The record medium may be advanced continuously during scanning with the positioning of the image elements controlled in accordance with the motion of the record medium, or the record medium may be held stationary during each scan and advanced between successive scans. An ink reservoir 23 holds inks of four different colors, i.e., black and three primary colors, and supplies them through a supply cable 24 having four conduits to corresponding secondary reservoirs (not shown) in the ink jet head 14. During printing the inks are supplied from the secondary reservoirs to the appropriate nozzles in the ink jet head under the control of the control unit 22 to produce the desired image.

The printing speed, which is the rate at which the record medium 10 is advanced through the printer during a printing operation, depends upon the rate at which the ink jet head makes successive printing scans across the record medium, the number of ink jet nozzles used to project ink onto the paper during each scan, and the spacing between adjacent lines of dots in the image. For high-quality printing, the apparatus should produce a print having about 300 or more lines per inch. On the other hand, where maximum quality is not necessary and higher printing speed is required, such as in the preparation of draft documents or other documents in which perfect appearance is not essential, prints having about 100 lines per inch are acceptable.

Figure 2:
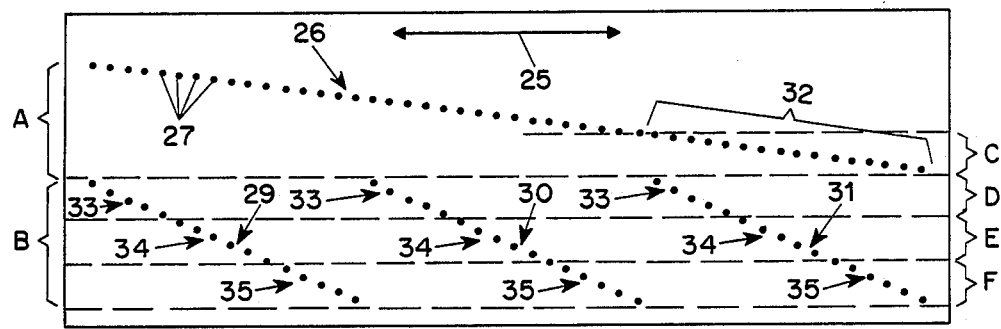
FIG. 2 is a diagrammatic view illustrating the arrangement of the ink jet nozzle arrays in accordance with one embodiment of the invention.

In accordance with the invention, the ink jet printer is arranged to produce either a high-quality, four-color print at a given print speed or a draft-quality, four-color print at a substantially higher print speed. For this purpose, the ink jet head 14 is provided with at least two arrays of nozzles. FIG. 2 illustrates the arrangement of the nozzle arrays in one embodiment of the invention. In that illustration, the direction of the reciprocating motion of the ink jet head 14 is represented by the arrow 25 and one linear array 26 containing 48 nozzles is disposed at a small angle, such as about 7.5°, to the direction of motion. In this way, the lines printed by adjacent ink orifices 27 of the array can be closely spaced as, for example, by 3.3 mils, even though the linear distance between the adjacent orifices is much larger, such as about 25 mils.

In the arrangement illustrated in FIG. 2, three additional arrays 29, 30 and 31, containing 16 nozzles each, are oriented at three times the angle of the array 26 with respect to the direction of motion of the ink jet head, i.e., about 22.5°. As a result, the arrays 29, 30 and 31 have the same dimension as that of the array 26 in the direction perpendicular to the scanning motion, and the spacing between the nozzles in that direction is three times that of the array 26.

Each of the arrays of nozzles 26 and 29–31 is connected within the ink jet head 14 so as to project ink of a different color. Preferably, since black ink is used for a larger proportion of most printing than the primary color inks, the nozzles in the array 26 are supplied with black ink, and the nozzles in the arrays 29, 30 and 31 are supplied with three primary color inks, such as yellow, magenta and cyan, for example.

With this arrangement, each transverse scanning motion of the ink jet head 14 can produce 48 adjacent lines of black ink on a strip of the record medium scanned by the section A in FIG. 2 and 16 lines of color printing in an adjacent strip scanned by the section B of FIG. 2.

Since the sections A and B have the same dimension in the direction of motion of the record medium 10, the corresponding strips on the record medium are of equal width. Consequently, if the record medium is advanced in the vertical direction as viewed in FIG. 1 by a distance corresponding to the dimension A during each scan of the ink jet head 14, the printing produced by the primary color ink jet nozzle arrays 29, 30 and 31 in the section B will be exactly superimposed on the black printing produced by the black ink nozzles 26 in the section A during the immediately preceding scanning motion to produce a four-color image.

In this case, however, because the primary color information section B has only 16 lines for each primary color and the record medium is being advanced at a rate of 48 lines per scan, the colors in the image will not have full saturation, but instead will be diluted by the other colors and by the background color of the record medium. Thus, for example, the blue portion of an image might be reproduced as a navy blue, slate blue or sky blue rather than in vivid blue. With this arrangement, satisfactory printing is provided for draft purposes or for applications in which maximum color quality is not necessary at a relatively high printing speed, which in the illustrated embodiment is a dimension corresponding to the section A during each scan of the print head.

To provide maximum color quality in the printed image, the control unit 22 is set to a high-quality mode, causing the record drive unit 21 to advance the record medium 10 at one-third the rate used in the draft-quality printing mode. In this mode, the control unit actuates only one group of 16 of the ink jet nozzles in the array 26 during each scan, such as the 16 nozzles in the group designated 32 in FIG. 2. These nozzles produce a strip on the record medium 10 having a width corresponding to the dimension C shown in FIG. 2 during each scan of the ink jet head and the record medium is advanced by that distance for each successive scan.

At the same time, the arrays of primary color ink nozzles 29, 30 and 31 produce three adjacent strips D, E and F having the same width as the strip C on the record medium so that, after four successive scanning motions of the ink jet head, the image contains 16 lines of black and 16 lines of each primary color at minimum line spacing, producing a high-quality, four-color image with full color saturation. To accomplish this, each of the color ink nozzle arrays 29, 30 and 31 is divided into three groups of nozzles 33, 34 and 35 corresponding to the regions D, E and F, respectively.

To provide 16 adjacent lines of each primary color during three successive scans, the nozzles in the groups 33, 34 and 35 must be displaced with respect to each other by one-third the spacing between the nozzles in each group so that when the groups of nozzles 34 are scanned across the region previously printed with the nozzles 33, the lines from the nozzles in the groups 34 will be printed adjacent to lines from the nozzles in the groups 33 and when the groups of nozzles 35 subsequently print in the same region, they produce lines between the lines previously produced by the nozzles in the groups 33 and 34. Thus, the nozzles in each of the groups 34 and 35 have the same spacing as the nozzles in the groups 33, but the first nozzle in the group 34 is separated from the last nozzle in the group 33 by a space which is one-third larger than the spacing between the nozzles, and the first nozzle in the group 35 is similarly separated from the last nozzle in the group 34 by a space which is one-third larger than the spacing between the nozzles. In order to provide a total of 16 lines for three successive scans, the first groups of nozzles 33 have six nozzles each, whereas the groups 34 and 35 have five nozzles each.

With the arrangement shown in FIG. 2, a complete, high-quality, four-color image is produced in any given region of the record medium by four successive scans of the ink jet head across the region since all three primary colors are printed onto the same portion of the record medium during each scan of the head 14.

If desired, the primary color ink jet arrays 29, 30 and 31 of FIG. 2 may be spaced from the black ink jet array 26 in the direction of motion of the ink jet head rather than being spaced therefrom in the direction of motion of the record medium as illustrated in FIG. 2. In that case, all four colors are printed on the same region of the record medium during each scan of the head in the high-speed printing mode and only three successive scans of the head are required to print all four colors in the same region in the high-quality printing mode. Alternatively, the primary color arrays 29, 30 and 31 may, if desired, be spaced from the black ink nozzle array 26 in both the head scanning direction and in the direction of motion of the print medium, i.e., they may be shifted to the right or the left with respect to the arrangement shown in FIG. 2.

Figure 3:
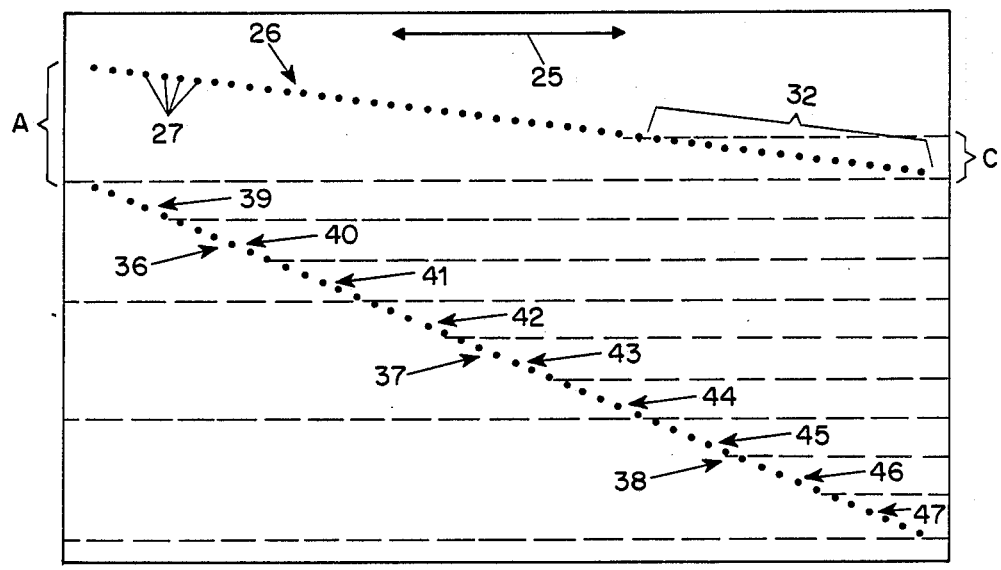
FIG. 3 is a diagrammatic view illustrating the arrangement of the ink jet nozzle arrays in accordance with another embodiment of the invention.

To facilitate the fabrication of the ink jet head, it may be desirable to provide an array of primary color ink jet nozzles disposed in a single line in the manner shown in FIG. 3. In this embodiment, the ink jet head 14 includes an array 26 of black ink nozzles similar to that of FIG. 2 along with three arrays 36, 37 and 38 of 16 yellow ink jet nozzles, 16 magenta ink jet nozzles and 16 cyan ink jet nozzles, respectively, disposed in a single line. Each of the arrays 36, 37 and 38 is in turn divided into three groups 39, 40 and 41; 42, 43 and 44; and 45, 46 and 47, respectively, corresponding to the groups 33, 34 and 35 of FIG. 2, and the spacing between the groups is one-third greater than the spacing of the nozzles within the groups as in the embodiment of FIG. 2. The aligned arrays 36, 37 and 38 are disposed at an angle with respect to the direction of scanning motion which is three times the angle of the array 26, resulting in a nozzle spacing in the direction of record medium motion which is three times that of the array 26 for the purposes described in connection with FIG. 2.

In this case, high-speed, draft-quality, four-color printing on a given region of the record medium is carried out by printing with all 48 black nozzles in the group 26 during one scan of the ink jet head across that region and then with all 16 nozzles of each primary color during each of the next three successive scans of the ink jet head, the record medium 10 being advanced by a distance A for each scan. Thus, a complete draft-quality image in any given region of the record medium is produced after four successive scans of the ink jet head, rather than after two scans as in the embodiment illustrated in FIG. 2.

For high-quality printing in the embodiment of FIG. 3, the record medium 10 is advanced by a distance corresponding to the distance C and a group of 16 black ink jet nozzles 32 are actuated during each scan as in the embodiment of FIG. 2. In this case, however, nine further scanning motions of the ink jet head are required to apply all of the primary color information to a given region of the record medium, so that ten scans are necessary to produce a complete four-color image. During each such scan, of course, the ink jet head prints image portions on ten immediately adjacent strips of the record medium.

If desired, the primary color ink jet arrays 36, 37 and 38 of FIG. 3 may also be spaced from the black ink jet array in the direction of motion of the ink jet head, i.e., they may be shifted to the left or the right as viewed in FIG. 3. In addition, the primary color array 36 may be disposed laterally adjacent to the black nozzle array 26 in the direction of motion of the record medium. For example, the three arrays 36, 37 and 38 may be shifted upward and to the left as viewed in FIG. 3, so that the array 36 is to the left of and in line with the array 26 and the arrays 37 and 38 occupy the positions of the arrays 36 and 37 as shown in FIG. 3, respectively. Alternatively, all three arrays 36, 37 and 38 may be shifted to the left or right by a distance equal to the width of the array 26 and moved upwardly as shown in FIG. 3 by the distance A. In either case, highspeed, four-color printing requires only three successive scans of the ink jet head and high-quality printing requires nine scans of the head.

In another alternative arrangement providing greater spacing between the nozzles of the primary color ink jet arrays than those of the black array, the arrays 36, 37 and 38 of FIG. 3 are disposed in three different lines, each oriented at the same angle as the array 26, rather than being disposed in a single line at a different angle as shown in FIG. 3, so that each of the primary color arrays have the same width in the direction of scanning motion as the black array.

In still other embodiments, the aligned nozzles in each of the primary color arrays have the same spacing as those in the black ink nozzle array and they are oriented at the same angle as the black ink array with respect to the direction of scanning motion of the ink jet head. One such embodiment is illustrated in FIG. 4, in which three arrays 48, 49 and 50 of primary color nozzles are linearly aligned and spaced from the black ink nozzle array 26 in the direction of motion of the print medium.

In the high-quality printing mode, only the 16 black ink jet nozzles designated 32 are used and the print medium is advanced by the distance C for each scan of the ink jet head. Thus, after four successive scans of the head over each region of the print medium, a high-quality, four-color image is obtained.

Figure 4:
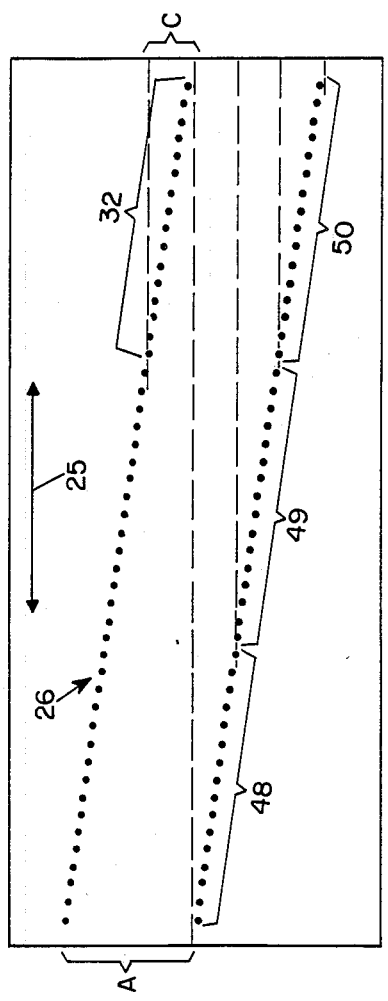
FIGS. 4 and 5 are diagrammatic views illustrating the arrangement of the ink jet nozzle arrays in accordance with further embodiments of the invention.

For high-speed printing with the embodiment of FIG. 4, all of the black ink jet nozzles are used and the print medium is advanced by the distance A for each scan. Thus, during two successive scans of the ink jet head, a strip of the print medium will be printed first with black ink from the nozzle array 26 and then with three adjacent rows of lines of the primary color from the nozzle arrays 48, 49 and 50. Accordingly, with this arrangement the color quality of the image is reduced on a spatial basis rather than with respect to the intensity of the color in the high-speed printing mode.

If desired, the aligned arrays of primary color nozzles 48, 49 and 50 may be spaced from the black array 26 in the direction of scanning motion rather than in the direction of motion of the record medium so that all four colors will be printed on the same region of the print medium during each scan of the ink jet head.

To eliminate the adjacent color stripes produced in the high-speed printing mode by the arrangement illustrated in FIG. 4, the nozzles projecting the three primary color inks may be alternated in a continuous array rather than being disposed in three adjacent arrays.

Figure 5:
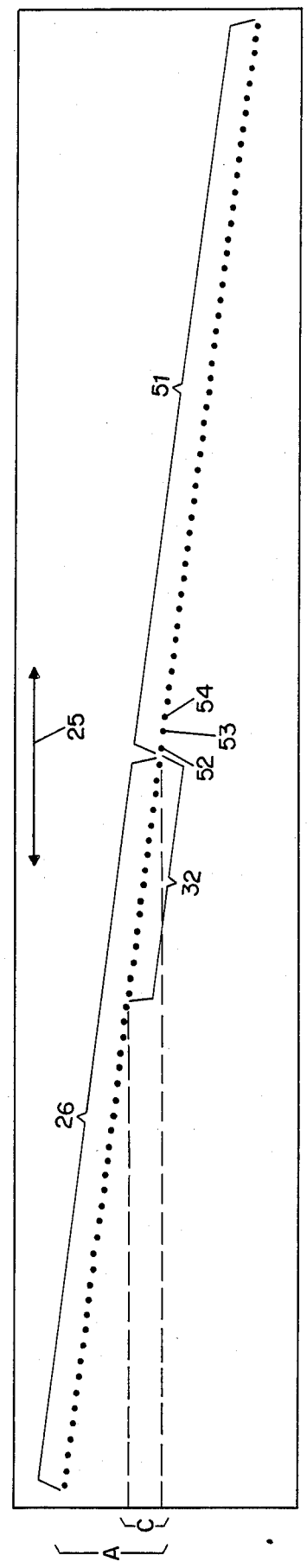

Such an arrangement is shown in the alternative embodiment illustrated in FIG. 5 wherein a primary color nozzle array 51 containing 48 nozzles is aligned with the 48 black ink nozzles in the array 26. In this case, the successive nozzles in the primary color array 51 alternate among the three primary colors so that, for example, a first nozzle 52 projects yellow ink, a second nozzle 53 projects magenta ink and a third nozzle 54 projects cyan ink and the sequence is repeated throughout the array 51.

Consequently, during high-speed printing with the arrangement of FIG. 5, when the print medium is advanced by the distance A for each scan of the ink jet head, all of the primary colors are printed in interlaced fashion, producing a four-color composite image after two successive scans over the same region, thereby eliminating the adjacent lines of primary colors formed in the high-speed mode with the embodiment shown in FIG. 4. The same interlaced primary color nozzle arrangement may also, of course, be used with the primary color array 51 of FIG. 5 disposed in spaced relation to the black array 26 either in the direction of motion of the print medium as illustrated in FIG. 4 or in the direction of scanning motion of the ink jet head, rather than being aligned with the array 26.

In another alternative arrangement, three primary color nozzle arrays arranged in a manner similar to that of FIG. 4 may be provided, but with a spacing between the nozzles in each of the color arrays three times that of the spacing between the nozzles and the black array so that each primary color array has the same dimension in the direction of scanning motion as the black array. Thus, for example, if all of the primary color arrays are aligned in the manner shown in FIG. 4, one color nozzle array will be to the left of the black array shown in FIG. 4, a second color array will be disposed in the position of the three color arrays illustrated in FIG. 4, and the third primary color array will be to the right and below the color nozzle arrays as viewed in FIG. 4. Alternatively, each of these expanded primary color nozzle arrays may be spaced from the other primary color arrays only in the direction of motion of the print medium or only in the direction of scanning motion of the ink jet head.

Although the invention has been described herein with reference to specific embodiments, many modifications and variations therein will readily occur to those skilled in the art. Accordingly, all such variations and modifications are included within the intended scope of the invention.

I claim:

1. A dual mode ink jet printer comprising an ink jet head having at least two arrays of ink jet nozzles, one of the arrays having fewer nozzles than the other array, record medium transport means for conveying a record medium in one direction past the ink jet head, drive means for driving the ink jet head in a direction parallel to the surface of a record medium conveyed by the transport means and in a direction transverse to the direction of motion of the record medium, ink supply means for supplying ink of at least two different colors to the ink jet head for printing onto the record medium through the two arrays of ink jet nozzles respectively, and control means for controlling the rate of motion of the record medium by the transport means and the operation of the ink jet head to produce high-quality multicolor printing at a relatively low printing speed with relatively close spacing between successive lines of images produced by the ink projected from both arrays in one mode of operation using fewer than all of the nozzles in the array having the larger number of nozzles, and lower quality multicolor printing having a relatively larger spacing between lines produced by at least one array of nozzles and a relatively higher printing speed using all of the nozzles in both arrays in a second mode of operation.

2. A printer according to claim 1 wherein one of the arrays of nozzles comprises a linear array disposed at a small angle with respect to the direction of motion of the ink jet head and another array comprises a linear array disposed at an angle with respect to the direction of motion of the ink jet head which is larger than the angle of the first array.

3. A printer according to claim 1 wherein the arrays are displaced from each other in the direction of motion of the record medium.

4. A printer according to claim 1 wherein the arrays are displaced from each other in a direction transverse to the direction of motion of the record medium.

5. A printer according to claim 1 wherein a first array is arranged to project black ink and a second array is arranged to project ink of at least one primary color and the spacing between adjacent nozzles in the second array with respect to the direction of motion of the record medium is approximately three times that of the nozzles in the first array.

6. A printer according to claim 5 wherein the record medium transport means is arranged to convey the record medium in said one mode of operation at a printing speed which is one-third the rate at which the record medium is conveyed in said second mode of operation.

7. A printer according to claim 5 wherein the second array includes three groups of nozzles for projecting ink of three primary colors, respectively.

8. A printer according to claim 1 wherein one of the arrays is arranged to project black ink and another array is arranged to project ink of a primary color and including two further arrays of aligned nozzles extending parallel to the primary color arrays for projecting ink of two other primary colors, respectively.

9. A printer according to claim 1 wherein one array of nozzles includes three aligned groups of nozzles for projecting ink of three primary colors onto the same region of a record medium during a single transverse motion of the ink jet head.

10. A printer according to claim 9 wherein each of the aligned groups contains at least two sets of nozzles which are spaced from each other by a distance which is different from the spacing between the nozzles of the sets in the direction of motion of the record medium.

11. A printer according to claim 10 wherein the spacing between adjacent sets in each of the aligned groups of nozzles is one-third larger than the spacing between the nozzles of each set so that successive transverse motions of the ink jet head across the same region of the record medium produces an image having adjacent lines spaced by one-third the distance between adjacent nozzles in the sets.

12. A dual mode ink jet printer comprising an ink jet head having at least two arrays of ink jet nozzles, one of the arrays having fewer nozzles than the other array, record medium transport means for conveying a record medium in one direction past the ink jet head, drive means for driving the ink jet head in a direction parallel to the surface of a record medium conveyed by the transport means and in a direction transverse to the direction of motion of the record medium, ink supply means for supplying ink of at least two different colors to the ink jet head for printing onto the record medium through the two arrays of ink jet nozzles respectively, and control means for controlling the rate of motion of the record medium by the transport means and the operation of the ink jet head to produce high-quality multicolor printing at a relatively low printing speed in a first mode of operation using fewer than all of the nozzles in the array having the larger number of nozzles and high-speed multicolor printing in a second mode of operation using more nozzles in the array having the larger number of nozzles in the second mode of operation than in the first mode of operation.

13. A printer according to claim 12 wherein one of the arrays of nozzles comprises a linear array disposed at a small angle with respect to the direction of motion of the ink jet head and another array comprises a linear array disposed at an angle with respect to the direction of motion of the ink jet head which is larger than the angle of the first array.

14. A printer according to claim 12 wherein the arrays are displaced from each other in the direction of motion of the record medium.

15. A printer according to claim 12 wherein the arrays are displaced from each other in a direction transverse to the direction of motion of the record medium.

16. A printer according to claim 12 wherein a first array is arranged to project black ink and a second array is arranged to project ink of at least one primary color and the spacing between adjacent nozzles in the second array with respect to the direction of motion of the record medium is approximately three times that of the nozzles in the first array.

17. A printer according to claim 16 wherein the record medium transport means is arranged to convey the record medium in said one mode of operation at a printing speed which is one-third the rate at which the record medium is conveyed in said second mode of operation.

18. A printer according to claim 16 wherein the second array includes three groups of nozzles for projecting ink of three primary colors, respectively.

19. A printer according to claim 12 wherein one of the arrays is arranged to project black ink and another array is arranged to project ink of a primary color and including two further arrays of aligned nozzles extending parallel to the primary color arrays for projecting ink of two other primary colors, respectively.

20. A printer according to claim 12 wherein one array of nozzles includes three aligned groups of nozzles for projecting ink of three primary colors onto the same region of a record medium during a single transverse motion of the ink jet head.

21. A printer according to claim 20 wherein each of the aligned groups contains at least two sets of nozzles which are spaced from each other by a distance which is different from the spacing between the nozzles of the sets in the direction of motion of the record medium.

22. A printer according to claim 21 wherein the spacing between adjacent sets in each of the aligned groups of nozzles is one-third larger than the spacing between the nozzles of each set so that successive transverse motions of the ink jet head across the same region of the record medium produces an image having adjacent lines spaced by one-third the distance between adjacent nozzles in the sets.

23. A printer according to claim 12 wherein one of the arrays includes three sets of nozzles for projecting inks of three primary colors respectively, the nozzles of the sets being alternately positioned in sequential relation with respect to the direction of motion of the record medium.

* * * * *